United States Patent
Murashima et al.

(10) Patent No.: US 8,641,300 B2
(45) Date of Patent: Feb. 4, 2014

(54) SPLICED OPTICAL CABLE ASSEMBLY

(75) Inventors: Kiyotaka Murashima, Kanagawa (JP);
Hiroyasu Toyooka, Kanagawa (JP);
Toshihiko Homma, Kanagawa (JP);
Ryuichiro Sato, Kanagawa (JP);
Keitaro Iwai, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 119 days.

(21) Appl. No.: 13/501,728

(22) PCT Filed: Oct. 1, 2010

(86) PCT No.: PCT/JP2010/067197
§ 371 (c)(1),
(2), (4) Date: Apr. 12, 2012

(87) PCT Pub. No.: WO2011/048926
PCT Pub. Date: Apr. 28, 2011

(65) Prior Publication Data
US 2012/0201500 A1    Aug. 9, 2012

(30) Foreign Application Priority Data
Oct. 19, 2009 (JP) ................................. 2009-240096

(51) Int. Cl.
*G02B 6/255* (2006.01)
(52) U.S. Cl.
USPC .............................................. 385/99; 385/95
(58) Field of Classification Search
USPC ........................................................ 385/99
See application file for complete search history.

(56) References Cited

U.S. PATENT DOCUMENTS

| | | | | |
|---|---|---|---|---|
| 4,516,830 A | * | 5/1985 | Guazzo | 385/99 |
| 5,894,536 A | * | 4/1999 | Rifkin et al. | 385/99 |
| 7,955,004 B2 | * | 6/2011 | DiMarco | 385/99 |
| 8,457,461 B2 | * | 6/2013 | Ott | 385/103 |
| 2007/0127875 A1 | * | 6/2007 | Allen et al. | 385/95 |

FOREIGN PATENT DOCUMENTS

| | | |
|---|---|---|
| JP | 55-079307 U | 11/1980 |
| JP | 58-156911 A | 9/1983 |
| JP | 59-176013 U | 11/1984 |
| JP | 09-230159 A | 9/1997 |
| JP | 2004-354732 A | 12/2004 |
| JP | 2005-77746 A | 3/2005 |
| JP | 2008-033266 A | 2/2008 |
| JP | 2008-065170 A | 3/2008 |

* cited by examiner

*Primary Examiner* — Ryan Lepisto
(74) *Attorney, Agent, or Firm* — Global IP Counselors, LLP

(57) ABSTRACT

A spliced optical cable assembly is reinforced at a spliced portion of coated optical fibers to have adequate strength. The spliced optical cable assembly includes: a pair of optical fiber cables in which high-strength fibers are aligned in the longitudinal direction around coated optical fibers. The outer circumference of the coated optical fibers being covered by sheaths. The spliced optical cable assembly further includes a connecting portion in which the pair of optical fiber cables are connected and the coated optical fibers extend from the sheaths. Glass fibers exposed from the coating of the coated optical fibers spliced to each other. The connected portion is covered and formed into an integral unit, together with the high-strength fibers exposed from the sheaths, by a reinforcing tube placed over the optical fiber cables and caused to contract so that both ends of the reinforcing tube engage the sheaths of the respective optical fiber cables.

10 Claims, 4 Drawing Sheets

SPLICED OPTICAL CABLE ASSEMBLY

FIELD OF THE INVENTION

The present invention relates to a connected optical cable in which a pair of optical fiber cables having coated optical fibers are connected to each other.

BACKGROUND

Japanese Laid-open Patent Publication No. 2008-33266 describes, as a technique for reinforcing a spliced portion in which coated optical fibers are connected to each other, a technique using an inner tube for housing a fusion-spliced portion, a rod-shaped high-strength body having a crescent-shaped cross section; and an outer tube covering the inner tube and the high-strength body. In addition, Japanese Laid-open Patent Publication No. 2008-65170 describes a holding member for a fusion-spliced portion capable of fixing an optical drop cable and a fusion-spliced portion of optical fibers exposed from the distal end of the optical drop cable, and an accommodating member for a fusion-spliced portion in which the holding member is housed in a protective member.

Coated optical fibers have low resistance against tensile force. Accordingly, merely extending a reinforcing rod along the fusion-spliced portion and placing a heat shrink tube over the entire fusion-spliced portion to reinforce the fusion-spliced portion does not provide adequate strength against the tensile force in the reinforcing section, and there is a concern that defects will occur in the fusion-spliced portion. When the defects occur in the fusion-spliced portion, the entire installed optical fiber cable must be redrawn, and the optical fiber cable and the operation to wire the cable become inefficient.

SUMMARY OF INVENTION

Technical Problem

An object of the present invention is to provide a connected optical cable in which the connected portion of a pair of optical fiber cables that include coated optical fibers is reinforced to have adequate strength.

Solution to Problem

To achieve the aforementioned object, a connected optical cable is provided, including: a pair of optical fiber cables in which high-strength fibers are aligned in the longitudinal direction around coated optical fibers, the outer circumference of the coated optical fibers and the high-strength fibers being covered by sheaths; and a spliced portion in which the pair of optical fiber cables are connected, the coated optical fibers being extended from the sheaths, glass fibers exposed from the coating of the coated optical fibers being connected to each other, and the connected portion being covered and formed into an integral unit, together with the high-strength fibers exposed from the sheaths, by a reinforcing tube placed to engage the respective sheath of the optical fiber cables and caused to contract.

In the connected optical cable of the present invention, the high-strength fibers exposed from the sheaths can be folded back in a direction opposite to the extension direction of the coated optical fibers, and the folded sections may be covered by the reinforcing tube; and the high-strength fibers exposed from the sheaths can be aligned in the extension direction of the coated optical fibers and covered by the reinforcing tube.

In addition, the connector preferably further includes an inner tube for covering a section of the mutually connected glass fibers, both ends of the inner tube being placed to engage the respective coatings of the coated optical fibers and caused to contract; and preferably further includes a protective tube for covering the outer circumference of the reinforcing tube.

Advantageous Effects of Invention

In the connected optical cable of the present invention, the connected portion can be reinforced in a reliable and secure manner, and adequate strength against tensile force can be ensured.

DETAILED DESCRIPTION

Figure 1:
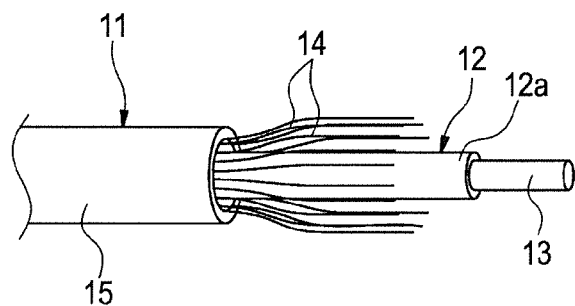
FIG. 1 is a perspective view of a cable end part in an embodiment of an optical fiber cable constituting a connected optical cable of the present invention.

Embodiments of the present invention will be described hereinafter with reference to the drawings. The drawings are provided for illustration only, and not for the purpose of limiting the scope of the invention. In order to avoid repetition in the description, the identical labels indicate the same portions in the drawings. The size ratio in the drawings is not necessarily accurate.

FIG. 1 is a perspective view of an end part in an embodiment of an optical fiber cable (optical fiber cable 11) constituting a connected optical cable according to the present invention. The optical fiber cable 11 has a coated optical fiber 12, a high strength fiber 14, and a sheath 15. The coated optical fiber 12 is a fiber in which a glass fiber 13 including a core and cladding and having an outside diameter of about 0.125 mm is covered by a resin coating 12a. The outside diameter of the fiber is about 0.9 mm. The high strength fiber 14 is a high-strength fiber 14 made of Kevlar® (registered trademark) or another aramid fiber or the like, and is aligned in the longitudinal direction around the coated optical fiber 12. The sheath 15 is made of, for example, vinyl chloride (PVC), and is adapted to cover the circumference of the high-strength fiber 14. The outside diameter of the optical fiber cable 11 is about 2.0 to 3.0 mm.

Figure 2:
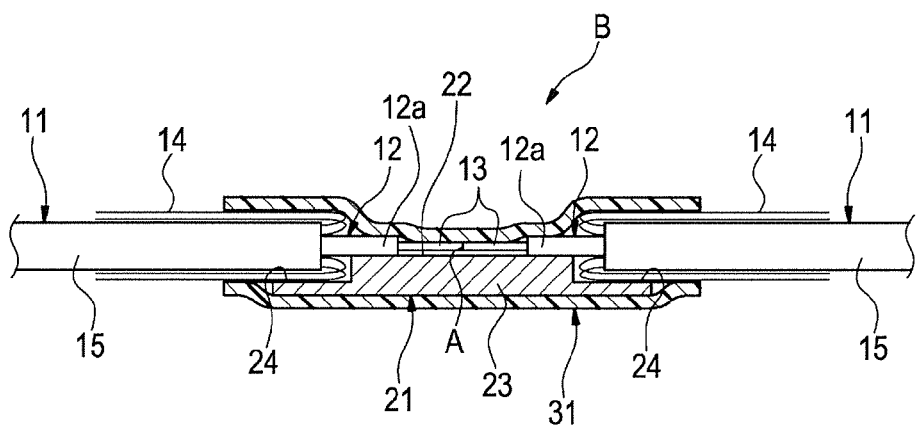
FIG. 2 is a cross-sectional view of the connected portion in an embodiment of the connected optical cable according to the present invention.

FIG. 2 is a cross-sectional view of a connected portion B according to an embodiment of the connected optical cable of the present invention. The end parts of each of a pair of optical fiber cables 11 constituting the connected optical fiber are treated to form a terminal, whereby the coated optical fibers 12 are extended from the sheaths 15, and the glass fibers 13 are exposed. The high-strength fibers 14 are also extended from the sheaths 15. Each of the coated optical fibers 12 is extended for about 5 mm from the sheaths 15, and the glass fibers 13 are exposed about 10 mm by removing the coatings 12a on the end parts of the coated optical fibers 12. The two glass fibers 13 are connected to each other by heat fusion.

Figure 3:
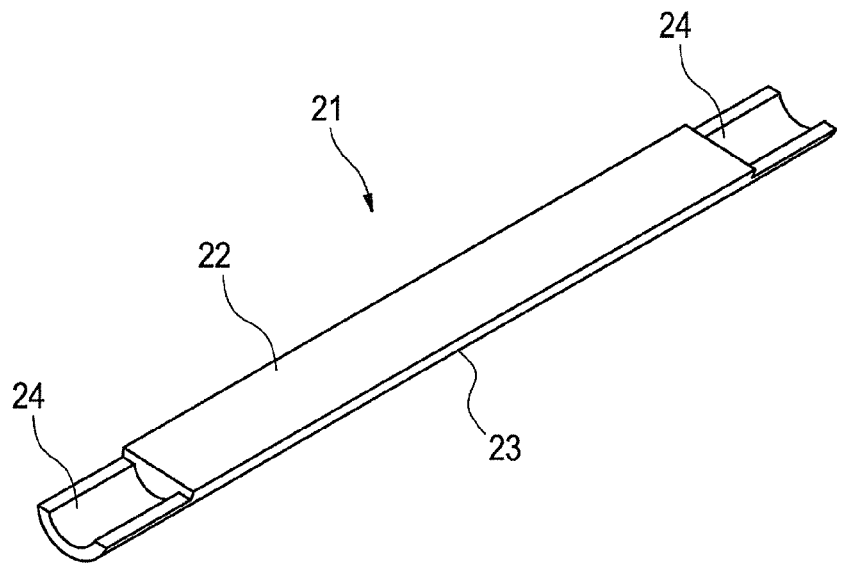
FIG. 3 is a perspective view of a reinforcing member used to reinforce the connected portion.

FIG. 3 is a perspective view of a reinforcing member 21 for reinforcing the connected portion B along the connected portion B. The reinforcing member 21 is formed, for example, from a metal such as stainless steel or steel, glass, or ceramic, and is provided with a flat part 22 and a curved part 23 having an arc-shaped cross-section. Cable holders 24 provided with a depression having an arc-shaped cross-section are formed on both ends of the flat part 22. A section of the coated optical fiber 12 is disposed on the flat part 22, and the sheaths 15 of the optical fiber cables 11 are disposed on the depressed cable holders 24 on both ends of the flat part 22.

The connected portion B including a spliced portion A and having the reinforcing member 21 arranged therein is thus covered and reinforced by a reinforcing tube 31. The reinforcing tube 31 is made of a thermosetting resin and is provided with an adhesion layer on the inside. Both ends of the reinforcing tube 31 are placed over the optical fiber cables 11 so as to engage the sheaths 15 of the optical fiber cables 11, and caused to contract by the application of heat. The reinforcing tube 31 is formed of a transparent resin, and the connected state of the spliced portion A inside of the reinforcing tube 31 can be visually confirmed.

The reinforcing tube 31 has a length of about 40 mm, and both ends of the tube are placed, over a distance of 5 mm or greater, over the sheaths 15 where high-strength fibers 14 that are exposed from the sheaths 15 are folded back in a direction opposite to the extension direction of the coated optical fibers 12 and are disposed on the outer circumference of the sheaths 15. The connected portion B is thereby covered together with the high-strength fibers 14 by the contracted reinforcing tube 31 to form an integral unit. The reinforcing tube 31 preferably has an outside diameter of about 2.5 to 4 mm at the two ends that cover the section of the sheath 15.

According to the connected optical cable of a first embodiment, the connected portion B can thus be securely reinforced by using the reinforcing tube 31 to cover the outer circumference of the connected portion B of the optical fiber cables 11, the connected portion B including the spliced portion A of the glass fibers 13 in the coated optical fibers 12. In addition, since both ends of the reinforcing tube 31 are place to engage the sheaths 15 of the optical fiber cables 11 and to caused to contract so that the connected portion B is integrated with the high-strength fibers 14 exposed from the sheaths 15, the connected portion B can be securely reinforced and can have an adequate strength against tensile force. In addition, the sheaths 15 and the high-strength fibers 14 arranged so as to fold back over the outer circumference of the sheaths 15 are formed into an integral unit by the reinforcing tube 31. This arrangement makes it possible to prevent the sheaths 15 and the high-strength fibers 14 from being displaced when tensile force is applied to the connected portion B, and good tensile strength functionality to be ensured.

Modification 1

Figure 4:
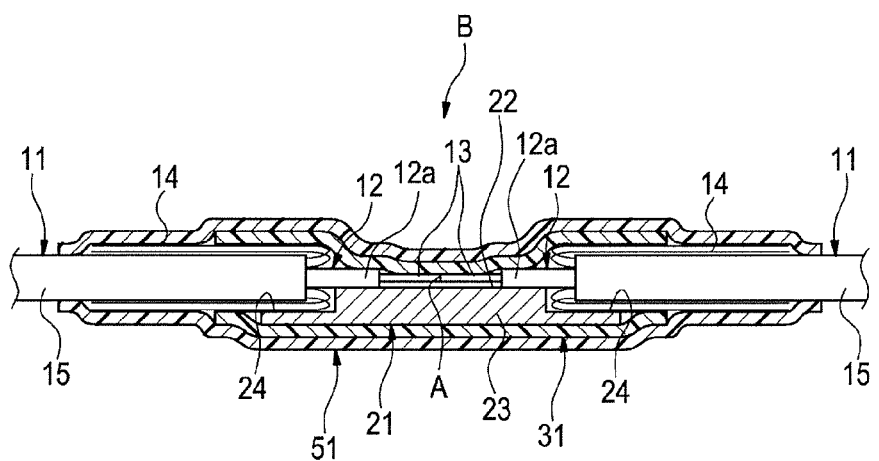
FIG. 4 is a cross-sectional view of the connected portion in an embodiment (Modification 1) of the connected optical cable according to the present invention.

FIG. 4 is a cross-sectional view of the connected portion in an embodiment (Modification 1) of the connected optical cable according to the present invention. In the connected optical cable in Modification 1, a protective tube 51 is placed over the circumference of the connected portion B covered by the reinforcing tube 31, and the protective tube 51 is heat contracted to form an integral unit. A weather-resistant tube made, for example, of an electron beam cross-linked soft polyolefin resin is preferably used as the protective tube 51.

Covering the connected portion B with the protective tube 51 allows the connected portion B to be more adequately protected and the effect of wind and rain on the connected portion B to be reduced even in a case in which, for example, the cable is installed outdoors. Using a tube formed of, for example, a colored or other nontransparent resin as the protective tube 51 allows the connected portion B to be protected from the effect of ultraviolet light.

Modification 2

Figure 5:
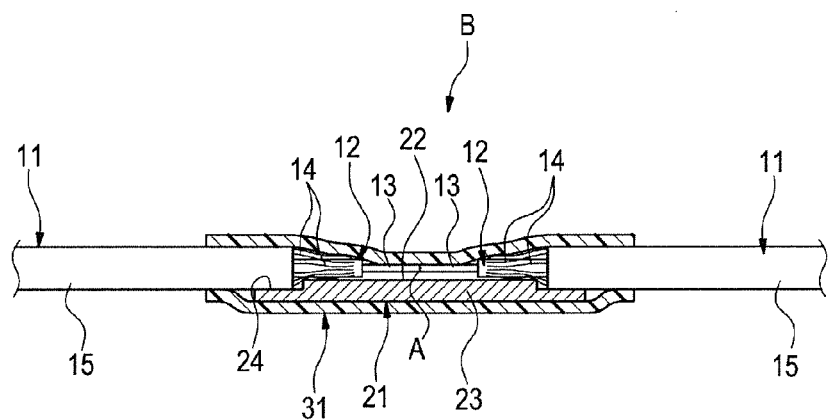
FIG. 5 is a cross-sectional view of the connected portion in an embodiment (Modification 2) of the connected optical cable according to the present invention.

FIG. 5 is a cross-sectional view of the connected portion in an embodiment (Modification 2) of the connected optical cable according to the present invention. In the connected optical cable in Modification 2, the high-strength fibers 14 exposed from the sheaths 15 of each of the optical fiber cables 11 are aligned in the extension direction of the coated optical fibers 12. The connected portion B is covered together with the high-strength fibers 14 by the reinforcing tube 31 and formed into an integral unit.

In Modification 2 as well, both ends of the reinforcing tube 31 are place to engage the sheaths 15 of the optical fiber cables 11 and caused to contract so that the connected portion B is formed into an integral unit together with the high-strength fibers 14 exposed from the sheaths 15. The connected portion B can therefore be securely reinforced, and adequate strength against tensile force can be ensured.

The high-strength fibers 14 can be shortened in Modification 2 in comparison with a case in which the high-strength fibers 14 are folded back over the outer circumference of the sheaths 15. Good handling characteristics are obtained during the connection operation with this arrangement. The high-strength fibers 14 are preferably of a length that does not reach the exposed glass fibers 13, and this allows the connected portion B to be reinforced without any defects being caused by the high-strength fibers 14 coming into contact with the glass fibers 13.

Modification 3

Figure 6:
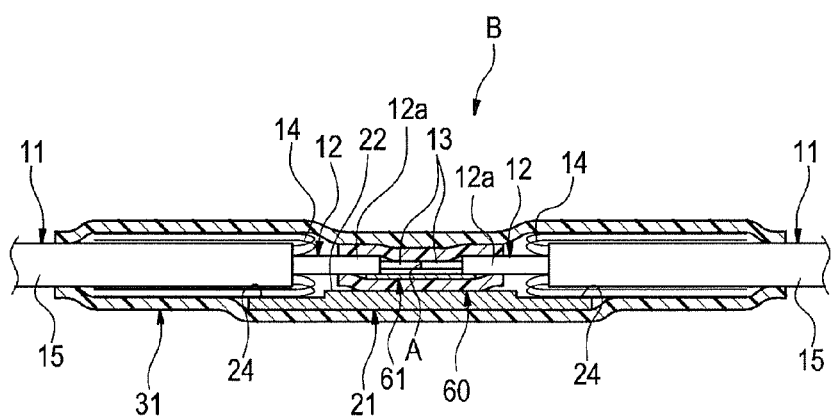
FIG. 6 is a cross-sectional view of the connected portion in an embodiment (Modification 3) of the connected optical cable according to the present invention.

FIG. 6 is a cross-sectional view of the connected portion in an embodiment (Modification 3) of the connected optical cable according to the present invention. In the connected optical cable in Modification 3, an inner tube 60 is placed over a section of the fusion-spliced glass fibers 13 so that both ends of the inner tube 60 engage the coatings 12a of the coated optical fibers 12. The inner tube 60 is made of a thermosetting resin, and is contracted by the application of heat. The inner tube 60 is also formed of a transparent resin, whereby the connected state of the spliced portion A can be visually confirmed.

In addition, an inner reinforcing member 61 is arranged along a section of the glass fibers 13 that includes the spliced portion A, and along a section of the coatings 12a of the coated optical fibers 12. The inner reinforcing member 61 is formed of, for example, a metal such as stainless steel or steel, glass, or ceramic as the reinforcing member 21. In order to reduce the possibility of damage to the glass fibers 13, the inner reinforcing member 61 preferably has no difference in level between the section in which a section of the glass fibers 13 is disposed and the section in which a section of the coatings 12a of the coated optical fibers 12 is disposed. This differs from the configuration of the reinforcing member 21.

In Modification 3 as well, both ends of the reinforcing tube 31 are placed to engage the sheaths 15 of the optical fiber cables 11 and to contract so that the connected portion B is formed into an integral unit together with the high-strength fibers 14 exposed from the sheaths 15. Accordingly, the connected portion B can be securely reinforced, and adequate strength against tensile force can be ensured.

Moreover, a section of the glass fibers 13 is covered together with the inner reinforcing member 61 by the inner tube 60 to form an integral unit. This arrangement allows the spliced portion A of the glass fibers 13 to be protected by the inner tube 60 as well, and the reinforcing strength to be further improved. The reinforcing member 21 can be omitted when sufficient strength can be ensured.

Modification 4

Figure 7:
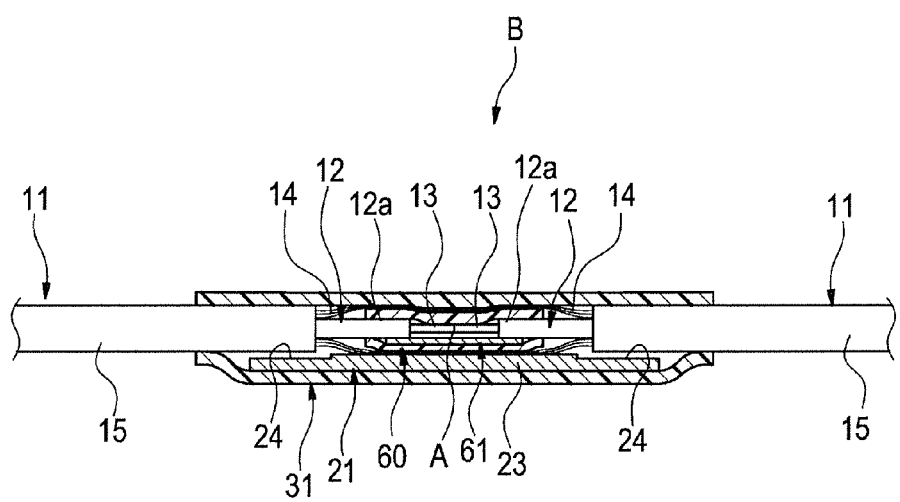
FIG. 7 is a cross-sectional view of the connected portion in an embodiment (Modification 4) of the connected optical cable according to the present invention.

FIG. 7 is a cross-sectional view of the connected portion in an embodiment (Modification 4) of the connected optical cable according to the present invention. In the connected optical cable in Modification 4, a section of the glass fibers 13 is covered together with the inner reinforcing member 61 by the inner tube 60 to form an integral unit in the same manner as in Modification 3. In addition, the high-strength fibers 14 exposed from the sheaths 15 of the optical fiber cables 11 are aligned in the extension direction of the coated optical fibers 12, and the connected portion B is covered together with the high-strength fibers 14 by the reinforcing tube 31 to form an integral unit in Modification 4.

In Modification 4 as well, both ends of the reinforcing tube 31 are placed to engage the sheaths 15 of the optical fiber cables 11 and caused to contract so that the connected portion B is formed into an integral unit together with the high-strength fibers 14 exposed from the sheaths 15. Accordingly, the connected portion B can be securely reinforced, and adequate strength against tensile force can be ensured.

Moreover, a section of the glass fibers 13 is covered together with the inner reinforcing member 61 by the inner tube 60 to form an integral unit. This arrangement allows the spliced portion A of the glass fibers 13 to be protected by the inner tube 60 as well, and the reinforcing strength to be further improved. In Modification 4, covering a section of the glass fibers 13 with the inner tube 60 allows the connected portion B to be reinforced without any defects being caused by the high-strength fibers 14 coming into contact with the glass fibers 13. The reinforcing member 21 can be omitted when sufficient strength can be ensured.

In Modifications 2 to 4, the outermost circumference of the reinforcing tube 31 can be further covered by the weather-resistant protective tube 51 in the same manner as in Modification 1 to allow the cable to be protected from wind, rain, and ultraviolet light in a case in which the cable is installed outdoor. The reinforcing tube 31 can also be weather-resistant.

The present invention can be used as an optical fiber cable for public communication networks or optical wiring in appliances, and can particularly ensure reliability in conditions in which tensile force is applied to the connected portion.

What is claimed is:

1. A spliced optical cable assembly comprising:
   a first optical fiber cable including:
      a coated optical fiber extending within the first optical fiber cable;
      a plurality of high-strength fibers extending in a longitudinal direction in alignment with and along an outer periphery of the coated optical fiber; and
      a sheath extending in the longitudinal direction covering the high-strength fibers and the coated optical fiber,
      at a first end of the first optical fiber cable an end section of the coated optical fiber extends in an extension direction out of the sheath, and end sections of the high-strength fibers also extend out of the sheath, the end sections of the high-strength fibers being folded back in a direction opposite the extension direction covering an outer periphery of the sheath adjacent to the first end of the first optical fiber cable;
   a second optical fiber cable having a coated optical fiber with an end section that extends outward from a first end of the second optical fiber;
   a reinforcing tube having a first end and a second end; and
   a reinforcing member disposed within the reinforcing tube, the reinforcing member having a first recessed end and a second recessed end, the first recessed end dimensioned to receive the coated optical fiber of the first optical fiber cable with the first end of the first optical fiber cable inserted into the first end of the reinforcing tube, the second recessed end being dimensioned to receive the coated optical fiber of the second optical fiber cable with the first end of the second optical fiber inserted into the second end of the reinforcing tube,
   wherein exposed ends of the coated optical fibers of the first and second optical fiber cables are held in alignment, abutting one another within the reinforcing tube along side the reinforcing member, and the end sections of the high-strength fibers being held against the outer periphery of the sheath adjacent to the first end of the first optical fiber cable by the reinforcing tube with the reinforcing tube in a heat contracted state.

2. The spliced optical cable assembly according to claim 1, wherein
   a first portion of the end sections of the high-strength fibers are covered by the reinforcing tube and a second portion of the end sections of the high-strength fibers extend out of the reinforcing tube.

3. The spliced optical cable assembly according to claim 2, further comprising
   an inner tube covering at least a portion of the reinforcing member and coatings of the end sections of the coated optical fibers of the first and second optical fiber cables, the inner tube and the reinforcing member holding the coated optical fibers in position with the inner tube in a heat contracted state.

4. The spliced optical cable assembly according to claim 1, further comprising
   an inner tube covering at least a portion of the reinforcing member and coatings of the end sections of the coated optical fibers of the first and second optical fiber cables, the inner tube and the reinforcing member holding the coated optical fibers in position with the inner tube in a heat contracted state.

5. The spliced optical cable assembly according to claim 4, further comprising
   a protective tube covering the outer circumference of the reinforcing tube.

6. The spliced optical cable assembly according to claim 1, further comprising
   a protective tube covering the outer circumference of the reinforcing tube.

7. The spliced optical cable assembly according to claim 6, further comprising
   the reinforcing member includes a central section between the first recessed end and the second recessed end that receives exposed optic fibers of the coated optical fibers with a coating of the coated optical fibers removed such that ends of the exposed optical fibers abut one another along the central section of the reinforcing member.

8. The spliced optical cable assembly according to claim 7, wherein
   the central section of the reinforcing member has a partially cylindrical contour on a first portion thereof and a flat surface on another portion thereof, the flat portion being arranged to receive the exposed optic fibers of the coated optical fibers.

9. The spliced optical cable assembly according to claim 1, further comprising the reinforcing member includes a central section between the first recessed end and the second recessed end that receives exposed optic fibers of the coated optical fibers with a coating of the coated optical fibers removed such that ends of the exposed optical fibers abut one another along the central section of the reinforcing member.

10. The spliced optical cable assembly according to claim 9, wherein the central section of the reinforcing member has a partially cylindrical contour on a first portion thereof and a flat surface on another portion thereof, the flat portion being arranged to receive the exposed optic fibers of the coated optical fibers.

* * * * *